Dec. 22, 1970  A. B. PALMER  3,549,337
METHOD OF SECURING DENSE, METAL-BONDED REFRACTORY
NITRIDE BODIES TO STEEL
Filed March 5, 1968
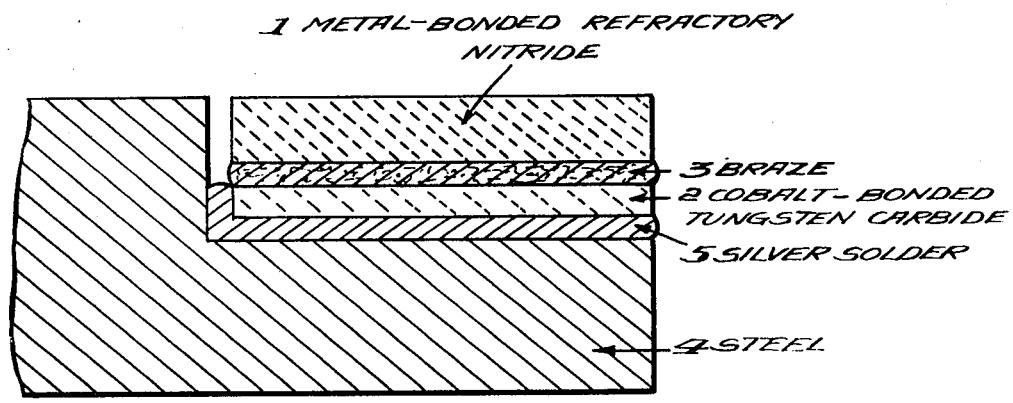
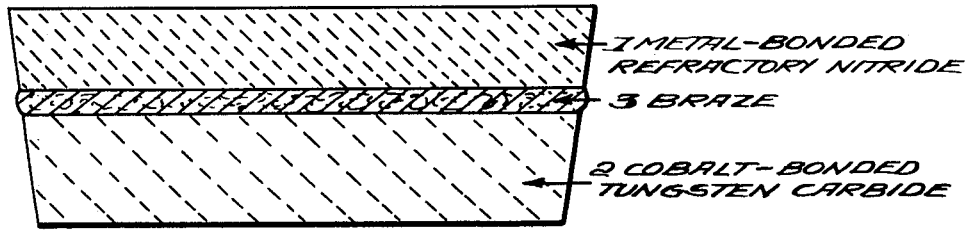
INVENTOR
ALAN B. PALMER,
BY Ron W. Huvelka
AGENT

United States Patent Office 3,549,337
Patented Dec. 22, 1970

3,549,337
METHOD OF SECURING DENSE, METAL-BONDED REFRACTORY NITRIDE BODIES TO STEEL
Alan B. Palmer, Wilmington, Del., assignor to E. I. du Pont de Nemours and Company, Wilmington, Del., a corporation of Delaware
Filed Mar. 5, 1968, Ser. No. 710,620
Int. Cl. B21c 1/00
U.S. Cl. 29—183.5         10 Claims

ABSTRACT OF THE DISCLOSURE

Dense, metal-bonded refractory nitride elements such as cutting edges are secured to metal supports such as steel tool shanks by metallurgically bonding between the two materials a dense, cobalt-bonded tungsten carbide connecting element having an expansion coefficient approximating that of the nitride element.

BACKGROUND OF THE INVENTION

This invention relates to a method of securing dense, metal-bonded refractory nitride composites to metals such as steel. The most important use for these dense nitrides is as cutting edges for milling and turning alloy steels; other uses include wear resistant, corrosion resistant and temperature reistant facings for equipment parts. In most of these applications the dense nitrides must be secured to a metal support such as a steel tool shank or equipment part. It is, however, extremely difficult to join these dense nitrides and steel, for example, primarily for two reasons.

First, the surface of nitrides tends to be oxidized during the process of brazing in air. If the surface does become oxidized, the surface is difficult to wet with brazes and solders.

The second, and more troublesome, problem encountered when attempting to bond the dense nitrides directly to metals such as steel is caused by the large difference between the coefficients of thermal expansion of the two materials. The metal contracts much more than the dense nitride as the two cool after being metallurgically bonded causing the laminate to bend with the outer surface of the nitride being subjected to such a strain that it cracks. In an attempt to overcome the thermal mismatch problem, shims of copper and bronze have been used between the dense nitride and metal; but much of the strain is still transmitted to the dense nitride.

One technique which has been suggested for securing materials of markedly different expansion coefficients involves the use of a connecting element commonly referred to as a "graded seal." This type of connecting element has an expansion coefficient which varies along its length in a stepwise or continuous manner and at each end matches that of the material to which it is bonded. In Zimmer, U.S. Pat. 3,284,174 and in Zimmer, "New Ways to Bond Dissimilar Materials," Material Progress (TM), January 1963, the use of graded seals produced by powder metallurgy is discussed in detail.

While the use of graded seals usually make it possible to obtain very secure bonds between dissimilar materials, it also has some unattractive aspects. For example, the production of graded seals is ordinarily very tedious and costly, and the seals often require more space than is a vailable in many applications for dense nitrides. Also, the expansion coefficients of both of the materials to be joined must be known before the seals can be produced.

This invention is founded on the discovery of a method by which metal-bonded refractory nitride composites can be secured to a metal such as steel without using connecting elements of continuously varying compositions. More particularly, I have discovered that this can be accomplished by using a dense, cobalt-bonded tungsten carbide connecting element having a substantially uniform expansion coefficient approximating that of the nitride. As compared with graded seals that might be used to connect refractory nitrides and metals, the tungsten carbide elements used in the methods and structures of this invention are much less costly, can be substantially smaller and need only have an expansion coefficient matching that of the nitride.

SUMMARY OF THE INVENTION

In summary, this invention relates to a composite structure comprising a dense, metal-bonded refractory nitride element metallurgically bonded to a dense, cobalt-bonded tungsten carbide element having a substantially uniform coefficient of thermal expansion of from about 0.7 to about 1.3 times that of said nitride element.

This invention is also directed to a composite structure comprising a dense, metal-bonded refractory nitride element, a metal supporting element and a dense, cobalt-bonded tungsten carbide element metallurgically bonded between said nitride element and said supporting element, said tungsten carbide element having a substantially uniform coefficient of thermal expansion of from about 0.7 to about 1.3 times that of said nitride body.

This invention is further directed to a method of securing a dense, metal-bonded refractory nitride element to a metal support comprising metallurgically bonding said nitride element to a dense, cobalt-bonded tungsten carbide base having a substantially uniform coefficient of thermal expansion of from about 0.7 to about 1.3 times that of said nitride element and thereafter metallurgically bonding said tungsten carbide base to said metal support.

DETAILED DESCRIPTION OF THE INVENTION

For simplicity, the dense, metal-bonded refractory nitride composites used in the methods and structures of this invention are hereinafter referred to merely as "nitride elements" or as "nitride cutting edges"; likewise, the dense, cobalt-bonded tungsten carbide composites are referred to as "tungsten carbide bases." Composite structures in which a nitride element is metallurgically bonded to a tungsten carbide base are termed "laminates."

In the drawings are shown two embodiments of this invention involving nitride cutting edges. FIG. 1 represents a cross-section of a tool for milling and turning hard materials such as alloy steels. In FIG. 1, a dense metal-bonded refractory nitride cutting edge is bonded to a slice of dense, cobalt-bonded tungsten carbide 2 by means of a layer of braze 3 which is preferably pure copper. The tungsten carbide slice, which has an expansion coefficient of from about 0.7 to about 1.3 times that of the cutting edge, is bonded to a steel shank 4 through a low-melting silver solder 5.

FIG. 2 represents a cross-section of an indexable insert for a cutting tool wherein a nitride cutting edge 1 is bonded to a tungsten carbide base 2 through a brazing material 3, the base having an expansion coefficient approximating that of the cutting edge. Inserts such as the one in FIG. 2 can be secured to a cutting tool by brazing the base to the tool, for example, by using a low-melting silver solder and a hand torch.

Nitride elements

The refractory nitrides which comprise the nitride elements used in the methods and structures of this invention include but are not limited to those of aluminum, niobium, hafnium, titanium, tantalum, zirconium and mixtures thereof. The metal binders in the nitride elements can be, for example, cobalt, molybdenum, nickel, iron, tungsten, rhenium and alloys thereof. Other hard components such as carbides of molybdenum, tungsten, titanium, vandadium, niobium and oxides such as aluminum tantalum can also be present in minor amounts.

Of particular utility in the methods and structures of this invention are the dense, metal-bonded refractory nitride bodies disclosed and claimed in three Yates U.S. applications No. 580,848, filed Aug. 29, 1966, now U.S. Patent 3,409,416 and Nos. 593,000, now U.S. Pat. 3,409,418 and 593,001, now U.S. Pat. 3,409,419, both filed on Nov. 9, 1966, which applications in their entirety are incorporated herein by reference. Of the nitride bodies disclosed in the Yates applications, those which are preferred for use in the methods and structures of this invention are the following:

(A) An interdispersion of from 1.5 parts to 19 parts by volume of a nitride selected from the group consisting of titanium nitride, zirconium nitride, tantalum nitride, hafnium nitride, aluminum nitride, vanadium nitride, niobium nitride and their mixtures, with one part by volume of a continuous matrix of a metal selected from the group consisting of molybdenum, tungsten, rhenium, their alloys with each other and their alloys with chromium, said interdispersion having a density in excess of 98% of its theoretical density and the metal and nitride having an average particle size of less than 10 microns;

(B) A dense homogeneous interdispersion of from 3 parts to 50 parts by volume of a nitride selected from the group consisting of vanadium nitride, zirconium nitride, hafnium nitride, niobium nitride, and their mixtures, with one part by volume of a metal selected from the group consisting of iron, cobalt, nickel, and their alloys, in the form of a continuous matrix, said interdispersion having a density in excess of 98% of its theoretical density and the metal and nitride having an average particle size of less than 10 microns; and (C) A homogeneous interdispersion of from 3 parts to 50 parts by volume of a refractory phase selected from the group consisting of titanium nitride, aluminum nitride, vanadium nitride, niobium nitride, zirconium nitride, tantalum nitride, hafnium nitride, and their mixtures, with one part by volume of a metal selected from the group consisting of iron, cobalt, nickel, and their alloys in the form of a continuous matrix and from 5 to 50% by volume based on the non-metal components of a wear-resistant compound selected from aluminum and tantalum nitrides, and oxides having a melting point in excess of 1400° C. and a free energy of formation greater than 80 kilocalories per gram atom of oxygen at 298° Kelvin, said interdispersion having a density in excess of 98% of its theoretical density and the metal, wear-resistant compound and nitride each having an average particle size of less than 10 microns.

Interdispersions A, B and C are disclosed and claimed in said applications 580,848, 593,000 and 593,001, respectively. These interdispersions are particularly useful as cutting edges for metal-working tools. Particularly preferred for use as cutting edges are nitride elements comprising titanium nitride, aluminum nitride or mixtures thereof bonded with tungsten, molybdenum, nickel or alloys thereof.

Particularly strong bonds are obtained between the nitride and tungsten carbide elements if the former is an electrical conductor and has a specific resistivity of less than 500 microhm-centimeters. Ordinarily, nitride elements containing less than 20 volume percent of an electrically conducting phase will have specific resistivities of greater than 1000 microhm-centimeters, whereas those containing more than 30% of an electrically conducting phase will have specific resistivities of less than 100 microhm-centimeters. At some value between 20 and 30 volume percent the specific resistivity for a given combination of components changes very markedly as the amount of electrically conducting phase is varied slightly. The exact value at which the specific resistivity changes at a maximum rate depends to a great extent on distribution of the electrically conducting phase. The strongest bonds are obtained with nitride elements having specific resistivities of less than 100 microhm-centimeters.

TUNGSTEN CARBIDE ELEMENTS

The bases used in this invention to secure the nitride elements to metal supports are comprised of cobalt bonded tungsten carbide, i.e., finely divided tungsten carbide bonded with a metallic phase of cobalt. As pointed out above, these bases have substantially uniform expansion coefficients of from about 0.7 to about 1.3 times that of the nitride. Preferably the expansion coefficient will be from about 0.9 to about 1.1 times that of the nitride. Thus, if the nitride element has a coefficient of expansion of $6 \times 10^{-6}/°$ C., the base will preferably have a coefficient of expansion not less than about $5.4 \times 10^{-6}$ or more than about $6.6 \times 10^{-6}/°$ C.

The expansion coefficient of cobalt-bonded tungsten carbide is primarily dependent on its cobalt concentration. According to Russian Metallurgy and Mining Journal 1964, Number 1, pages 113 to 121, cobalt-bonded tungsten carbides containing 6%, 10% and 12% by weight of cobalt have coefficients of thermal expansion of $5.0 \times 10^{-6}$, $5.3 \times 10^{-6}$ and $6.3 \times 10^{-6}$ per degree centigrade, respectively, compositions with more cobalt have higher coefficients. Since dense, metal-bonded refractory nitrides ordinarily have expansion coefficients ranging from $5 \times 10^{-6}$ to $7 \times 10^{-6}$ per degree centigrade, cobalt-bonded tungsten carbide composition with suitably matched expansion coefficients can be produced.

Tungsten carbide bases having densities of at least 99% of theoretical are generally preferred for use in this invention because of their high strength and stiffness.

METALLURGICAL BONDING

A variety of metallurgical bonding techniques can be used to produce the structures of this invention; but care must be taken to avoid oxidation of the nitride. The nitride-carbide bond can be formed for example by hot pressing the two elements to one another. Brazing techniques however are ordinarily more convenient.

Brazing metals suitable for bonding the nitride and carbide elements are strong, ductile metals having melting points higher than about 1000° C., e.g., copper, silver and alloys of iron, cobalt and nickel.

In one preferred method of forming the nitride-carbide joint a freshly cut nitride element is placed in boiling trichloroethylene to remove any grease which may be present. A sheet of cleaned, pure copper foil from 0.005 to 0.015 inch thick is placed between the surfaces to be joined and the resulting sandwich is bound together tigthly with Nichrome or pure iron wire. This assembly is then positioned in a high vacuum furnace so that the foil is situated horizontally and is heated to about 1200° C. for 5 minutes under a vacuum at a pressure of less than $10^{-4}$ torr. The heating need only be long enough to establish good wetting of the surfaces by the liquid copper. The assembly is then allowed to cool to about 200° C. in less than about ten minutes and is then removed from the furnace. The carbide side of the resulting laminate is cleaned by sandblasting and is brazed to a metal support using a conventional low-melting silver solder.

While pure copper is one of the preferred brazing materials for joining the nitride body to the cobalt-bonded tungsten carbide bodies, it is also possible to use commercial, high-copper brazing alloys such as B-C-U, ASTM Classification, which is 99.9% copper containing 0.1% phosphorus as a deoxidizing agent. Another alternate for pure coper is a high-melting alloy or brazing material designated RB- Cu-Zn-D, ASTM Classification, which has a solidus at 1690° F. and which contains 40% copper, 40% zinc, 10% cadmium and 10% nickel.

A particularly preferred silver solder for forming the nitride-carbide joint contains 57.5% silver, 32.5% copper, 7% tin and 3% manganese, has a melting point of 1120° F. and a flow point of 1545° F.; this braze is known commercially as Handy and Harmon Braze No. 580. This braze wets freshly cut surfaces of nitrides very well.

Whenever brazing of the nitride and carbide is carried out in air, it is important that freshly cut surfaces of the nitride be degreased and then covered thoroughly with a fluoride flux to prevent oxidation as the nitride is heated to high temperatures. If oxidation occurs, it is necessary to regrind or cut a fresh surface on the nitride in order to obtain good bonding. Suitable fluoride fluxes include "Eze-Flo" No. 3 (Handy and Harmon) which contains a mixture of metal fluorides. Other suitable fluxes are those which contain 48% by weight potassium hydrogen fluoride and 52% by weight of a mixture of fluorides of copper, cadmium and nickel.

For joining the tungsten carbide bases to steel, low-melting silver-containing solders ordinarily used to secure cobalt-bonded tungsten carbide cutting edges to steel can be employed. A preferred solder for this purpose is a silver solder designated B-Ag$_3$, ASTM Classification, which has a solidus temperature of 1170° F. and consists of 50% silver, 15.5% copper, 15.5% zinc, 16% cadmium and 3% nickel.

EXAMPLE 1

Nitride

Composition: 40% by volume titanium nitride, 30% by volume aluminum nitride and 30%, by volume 90% tungsten–10% nickel alloy.
Expansion coefficient: $3.24 \times 10^{-6}$/° F.
Specific resistivity: 56 microhm-centimeters.
Density: 99+% of theoretical.
Dimensions: 1 inch x 1 inch x 1/16 inch.

Tungsten carbide

Composition: 87% tungsten carbide and 13% cobalt.
Expansion coefficient $2.98 \times 10^{-6}$/° F.
Density: 99+% of theoretical.
Dimensions: 1 inch x 1 inch x 1/16 inch.

The nitride and tungsten carbide slices are each ground flat on one side to a surface finish of 100 microinches and are then degreased in boiling trichloroethylene for five minutes. A sheet of copper foil 0.010 inch thick is placed between the ground surfaces of the degreased slices. The assembly is then tied together tightly with a No. 24 Nichrome wire and is heated to 1200° C. in ten minutes under a vacuum of $10^{-4}$ torr. This temperature is maintained for two minutes and the assembly is then cooled to less than 600° C. within 15 minutes.

The carbide side of the laminate is then brazed to a steel shank in a conventional manner with silver solder having a melting point below 900° C. The tool is then diamond ground and used for turning AISI 4340 alloy steel at 800 surface feet per minute, a feed of 0.020 inch per revolution and a depth of 0.050 inch.

EXAMPLE 2

Three laminates 1 1/16 inches by 1 1/16 inches square and 1/4 inch thick are produced as described in Example 1. Each laminate is diamond sawed into four equal square pieces which are finished ground to form rectangular cutting inserts (0.500 by 0.500 by 3/16 inch) having a radius of 1/32 inch ground on each corner. The twelve inserts so produced are brazed in a negative rake milling head which is then used to face mill a slab of AISI 4140 steel at 700 surface feet per minute, 0.010 inch feed per revolution, 0.050 inch depth and two inches width of cut. A total cut of 90 feet in length is made before the inserts fail and need to be reground.

EXAMPLE 3

Nitride body

Composition: 27% by volume finely divided tungsten, 3% by volume nickel, 30% by volume aluminum nitride and 40% by volume titanium nitride. The nonmetallic components are in a finely divided network interpenetrated with a co-continuous network of the metallic phase. Homogeneous regions of each phase are no larger than above five microns in diameter.
Density: 99+% of theoretical.
Dimensions: 1 inch x 1 inch x 0.06 inch.

Tungsten carbide

Composition: 85% tungsten carbide and 15% cobalt.
Expansion coefficient: About 0.95 times that of the nitride.
Density: 99+% of theoretical.
Dimensions: 1 inch x 1 inch x 0.06 inch.

The nitride and tungsten carbide slices are ground and cleaned as described in Example 1. A sheet of pure copper 0.005 inch thick is placed between the two ground surfaces and the resulting sandwich is pressed together and bound with No. 24 B & S gauge nickel-iron wire. The resulting assembly is heated to 1175° C. in 15 minutes under a vacuum of $10^{-3}$ torr. This temperature is maintained for five minutes, and the assembly is then cooled to room temperature in about 20 minutes.

The resulting laminate is ground as an insert to fit the pocket in a gun drill in which a cobalt bonded tungsten carbide insert is ordinarily used. The tungsten carbide side of the insert is brazed into the pocket using "Eze Flo" No. 3 brazing alloy and a conventional brazing flux. Brazing is carried out with a propane gas hand torch. The drill is then ground in the same manner as when carbide is used and is employed to bore AISI 4340 steel shafts.

EXAMPLE 4

Nitride

Composition: 87.6% by volume zirconium nitride, 5% by volume molybdenum, 4.7% by volume nickel, 1.6% by volume iron and 1.1% by volume tungsten carbide.
Density: 99+% of theoretical.
Dimensions: 3/4 inch x 3/4 inch x 1/16 inch.

The nitride body, which is produced by hot-pressing the components in the form of submicron grains, has a transverse rupture strength of 252,800 p.s.i. and a hardness of 90.0 Rockwell A.

Tungsten carbide

Composition: 94% tungsten carbide and 6% cobalt.
Expansion coefficient: 0.80 times that of the nitride.
Density: 99+% of theoretical.
Dimensions: 3/4 inch x 3/4 inch x 1/8 inch.

The tungsten carbide body has a transverse rupture strength of 285,000 p.s.i. and a hardness of 92.0 Rockwell A.

A laminate is produced from the nitride and tungsten carbide slices as described in Example 3. The carbide side is then silver-soldered into the pocket of an inserted-blade milling cutter used for face-milling malleable cast iron.

EXAMPLE 5

A rapidly hot-pressed, non-porous, submicron-grained composition consisting of 40% by volume titanium nitride, 20% by volume titanium carbide and 20% by volume of an alloy consisting of 90% by weight tungsten and 10% by weight nickel is cut into slices 1 inch x 1 inch x 1/16 inch dimensions. The slices are then laminated with 1 inch x 1 inch x 1/4 inch slices of tungsten carbide bonded with 12% by weight of cobalt using Handy and Harmon No. 580 braze. 3/4 inch x 3/4 inch by 1/4 inch inserts, Style SNG–644 are cut and ground from these laminates. The nitride layer in the insert is 0.050 inch thick. These inserts are used in an 8-inch diameter milling cutter head for milling slots in AISI 4140 steel rifle receivers.

EXAMPLE 6

Style SNG-644 inserts having the dimension of those in Example 5 are produced from a dense, hot-pressed composition consisting of 70% by volume of aluminum nitride bonded with 30% by volume of tungsten. This composition has a transverse rupture strength of 148,000 p.s.i. and a Rockwell A hardness of 86.0. The nitride slices are bonded to tungsten carbide bonded with 12% by weight cobalt as in Example 5. The inserts are used for turning 4340 steel at 900 surface feet per minute, a cut depth of 0.050 inch and a feed of 0.010 inch per revolution using a negative rake angle of five degrees.

What is claimed is:

1. A composite structure comprising a dense, metal-bonded refractory nitride element metallurgically bonded to a dense, cobalt-bonded tungsten carbide element having a substantially uniform coefficient of thermal expansion of from about 0.7 to about 1.3 times that of said nitride element.

2. The composite structure of claim 1 wherein said tungsten carbide element has a substantially uniform expansion coefficient of from about 0.9 to about 1.1 times that of said nitride element.

3. The composite structure of claim 2 wherein said tungsten carbide element has a density of at least 99% of theoretical.

4. The composite structure of claim 3 wherein said nitride element has a specific resistivity of less than 100 microhm-centimeters.

5. The composite structure of claim 3 wherein said nitride element has a density of at least 98% of theoretical.

6. The composite of claim 5 wherein said nitride element has a specific resistivity of less than 100 microhm-centimeters.

7. A composite structure comprising a metal-bonded refractory nitride element selected from
   (A) an interdispersion of from 1.5 parts to 19 parts by volume of a nitride selected from the group consisting of titanium nitride, zirconium nitride, tantalum nitride, hafnium nitride, aluminum nitride, vanadium nitride, niobium nitride and their mixtures, with one part by volume of a continuous matrix of a metal selected from the group consisting of molybdenum, tungsten, rhenium, their alloys with each other and their alloys with chromium, said interdispersion having a density in excess of 98% of its theoretical density and the metal and nitride having an average particle size of less than 10 microns;
   (B) a dense homogeneous interdispersion of from 3 parts to 50 parts by volume of a nitride selected from the group consisting of vanadium nitride, zirconium nitride, hafnium nitride, niobium nitride, and their mixtures, with one part by volume of a metal selected from the group consisting of iron, cobalt, nickel, and their alloys, in the form of a continuous matrix, said interdispersion having a density in excess of 98% of its theoretical density and the metal and nitride having an average particle size of less than 10 microns; and
   (C) a homogeneous interdispersion of from 3 parts to 50 parts by volume of a refractory phase selected from the group consisting of titanium nitride, aluminum nitride, vanadium nitride, niobium nitride, zirconium nitride, tantalum nitride, hafnium nitride, and their mixtures, with one part by volume of a metal selected from the group consisting of iron, cobalt, nickel, and their alloys in the form of a continuous matrix and from 5 to 50% by volume based on the non-metal components of a wear-resistant compound selected from aluminum and tantalum nitrides, and oxides having a melting point in excess of 1400 C. and a free energy of formation greater than 80 kilocalories per gram atom of oxygen at 298° Kelvin, said interdispersion having a density in excess of 98% of its theoretical density and the metal, wear-resistant compound and nitride each having an average particle size of less than 10 microns; metallurgically bonded to a cobalt-bonded tungsten carbide element having a density of at least 98% of theoretical and a substantially uniform coefficient of thermal expansion of from about 0.7 to about 1.3 times that of said nitride element.

8. The composite structure of claim 7 wherein said nitride element is in the form of a cutting edge.

9. A composite structure comprising a metal-bonded refractory nitride element comprising titanium nitride, aluminum nitride or mixtures thereof bonded with tungsten, molybdenum, nickel or alloys thereof, having a density of at least 98% of theoretical and having a specific resistivity of less than 100 micron-centimeters metallurgically bonded to a cobalt-bonded tungsten carbide element having a density of at least 99% of theoretical uniform coefficient of thermal expansion of from about 0.7 to about 1.3 times that of said nitride element.

10. The composite structure of claim 9 wherein said nitride element is in the form of a cutting edge.

References Cited

UNITED STATES PATENTS

| | | | |
|---|---|---|---|
| 3,091,027 | 5/1963 | Clair | 29—472.7 |
| 3,284,174 | 11/1966 | Zimmer | 29—183.5 |
| 3,344,505 | 10/1967 | Rively et al. | 29—473.1 |
| 3,409,416 | 11/1968 | Yates | 29—182.5 |
| 3,409,418 | 11/1968 | Yates | 29—182.5 |
| 3,409,419 | 11/1968 | Yates | 29—182.5 |
| 3,413,711 | 11/1968 | Brewer et al. | 29—473.1 |

WINSTON A. DOUGLAS, Primary Examiner

O. F. CRUTCHFIELD, Assistant Examiner

U.S. Cl. X.R.

29—473.1